June 6, 1939.  R. C. BURNLEY  2,160,809
ANIMAL TRAP
Original Filed June 22, 1936   3 Sheets-Sheet 1
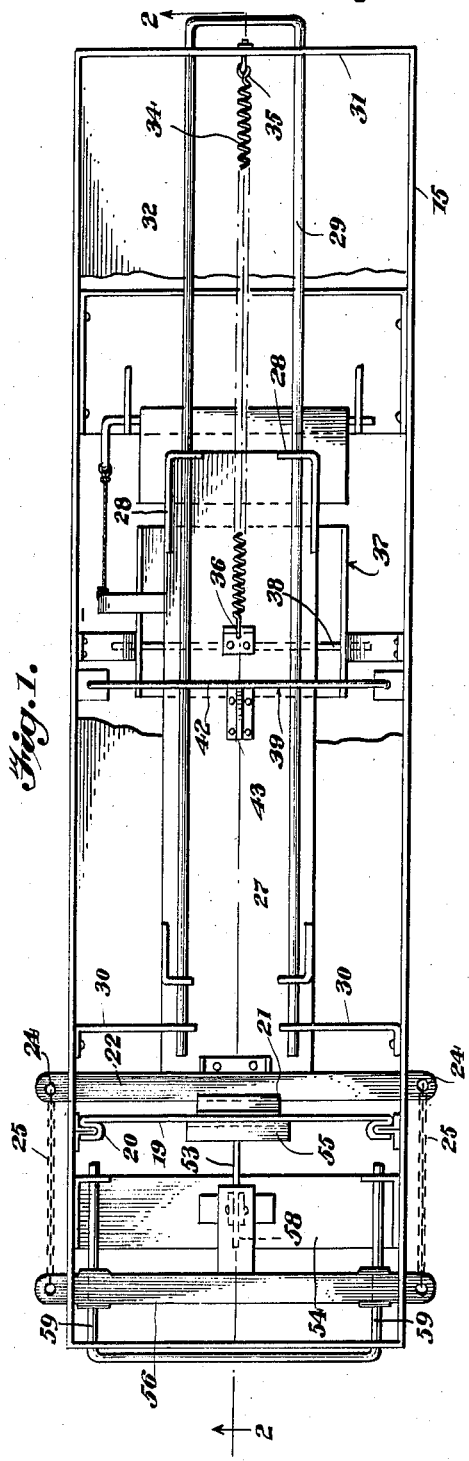
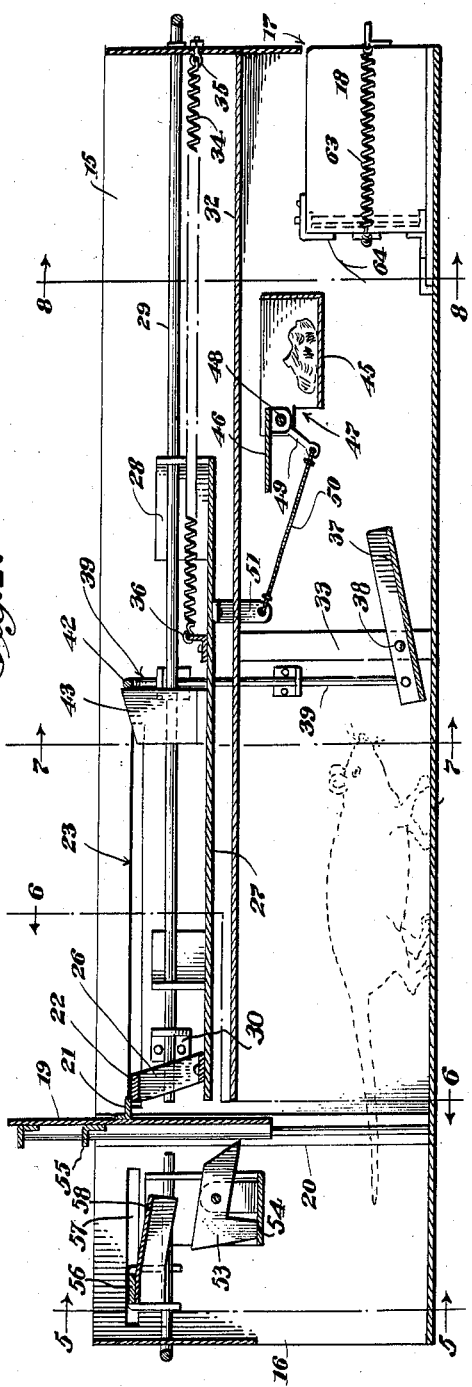
INVENTOR
ROBERT C. BURNLEY
BY
ATTORNEY

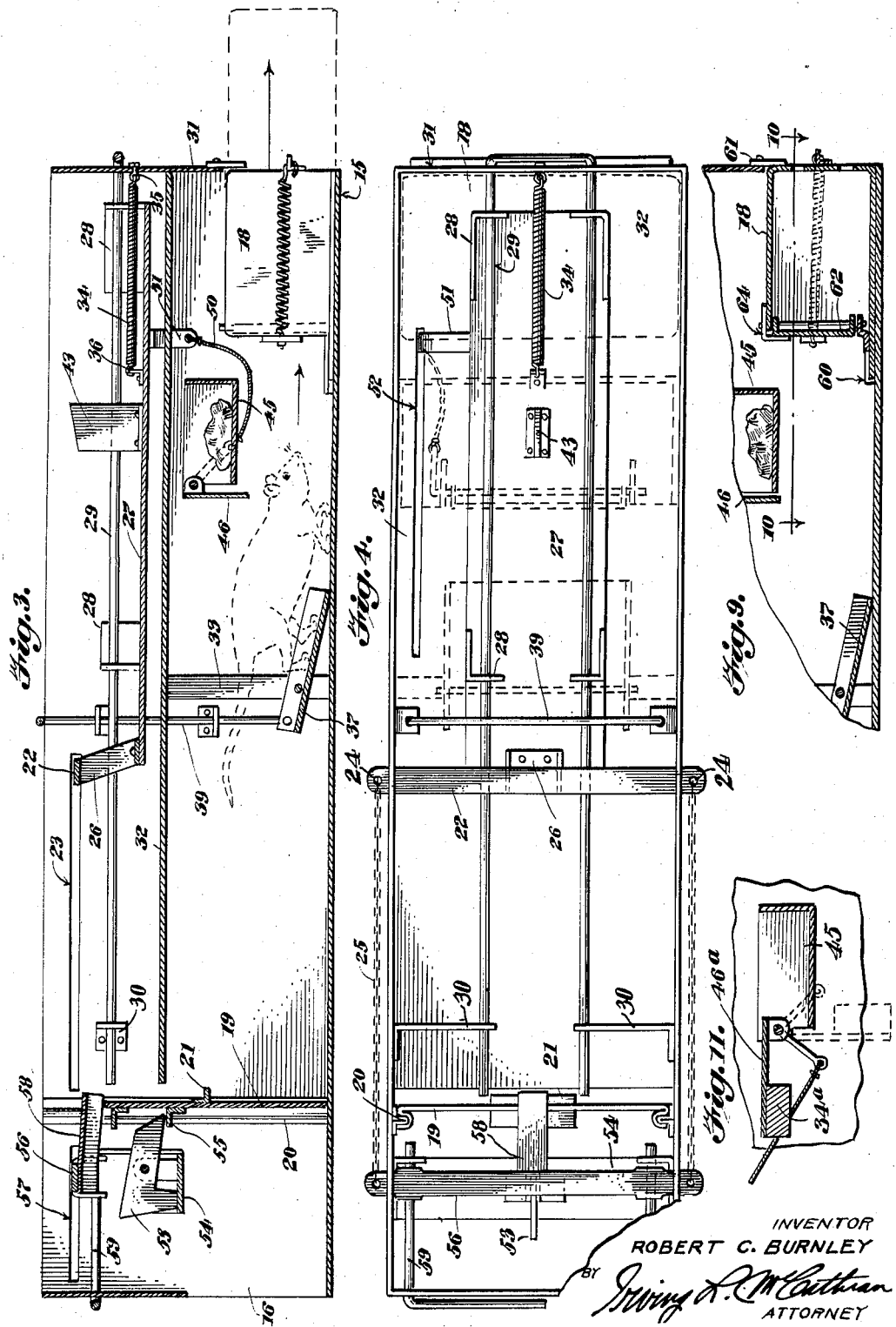

June 6, 1939.   R. C. BURNLEY   2,160,809
ANIMAL TRAP
Original Filed June 22, 1936   3 Sheets-Sheet 3
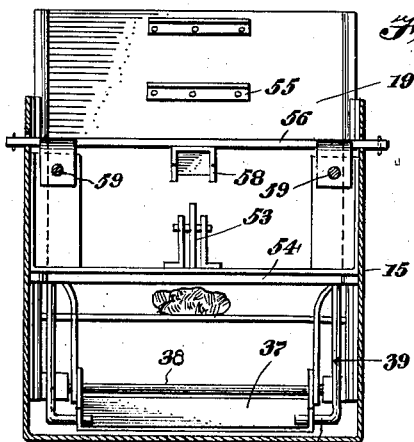
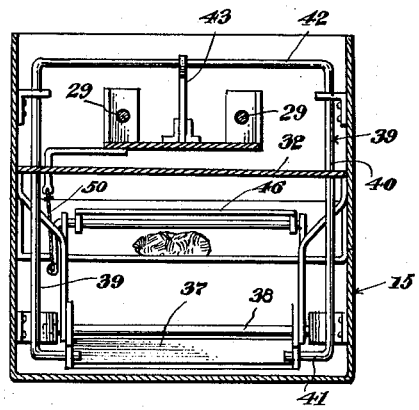
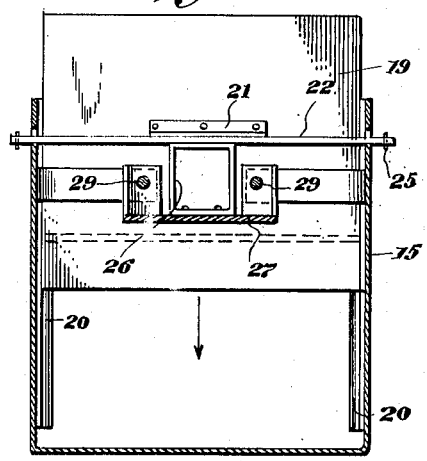
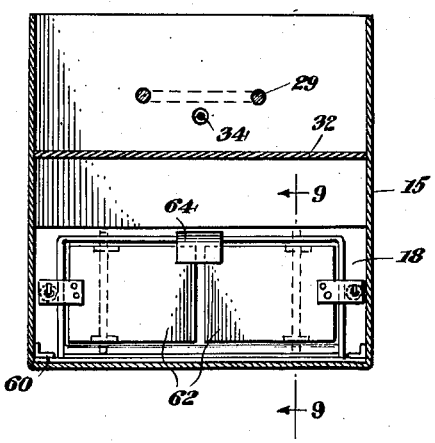
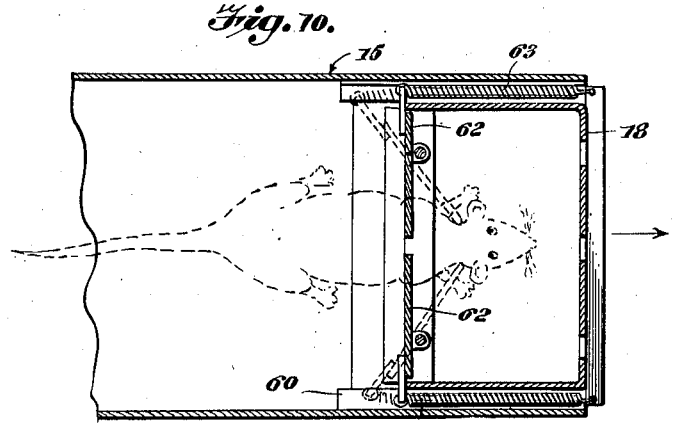
INVENTOR
ROBERT C. BURNLEY
BY
Irving L. McCathran
ATTORNEY Patented June 6, 1939

2,160,809

UNITED STATES PATENT OFFICE 2,160,809

ANIMAL TRAP

Robert C. Burnley, Louisville, Ky.

Application June 22, 1936, Serial No. 86,659
Renewed November 4, 1938

10 Claims. (Cl. 43—67)

This invention relates to animal traps, and has for one of its principal objects the production of a simple and efficient means for trapping animals, and more particularly to means for automatically closing the trap after the animal has entered the trap.

A further object of this invention is the production of a simple and efficient means for holding the door in an open position and automatically tripping the door as the animal entering the trap approaches the bait box.

A further object of this invention is the production of a simple and efficient means for executing the animal when the animal makes an attempt to leave the trap.

Other objects and advantages of the present invention will appear throughout the following specification and claims.

In the drawings:

Figure 1 is a top plan view of the trap;

Figure 2 is a longitudinal sectional view taken on line 2—2 of Figure 1, the parts being shown in a set position;

Figure 3 is a similar longitudinal sectional view, the parts being shown in a sprung position;

Figure 4 is a top plan view of the trap, the parts being shown in a sprung position and certain parts being shown in dotted lines;

Figure 5 is a vertical sectional view taken on line 5—5 of Figure 2;

Figure 6 is a vertical sectional view taken on line 6—6 of Figure 2;

Figure 7 is a vertical sectional view taken on line 7—7 of Figure 2;

Figure 8 is a vertical sectional view taken on line 8—8 of Figure 2;

Figure 9 is a fragmentary longitudinal section taken on line 9—9 of Figure 8;

Figure 10 is a horizontal sectional view taken on line 10—10 of Figure 9; and

Figure 11 is a transverse sectional view through the bait box illustrating a weighted section which may be substituted for the springs in the trip mechanism.

By referring to the drawings, it will be seen that 15 designates the body of the trap or casing which is preferably rectangular in shape, having an entrance opening 16 at its forward end and also an opening 17 at its rear end for receiving an execution box 18.

A vertical sliding door 19 is carried by the vertical tracks 20 near the forward entrance opening 16 within the casing or body 15 of the trap and this door 19 is provided with a flange 21 upon its inner face which is adapted to be engaged by the transversely extending supporting bar 22 for supporting the door 19 in a set or raised position, such as is shown in Figure 2. This transversely extending bar 22 is slidably mounted through the longitudinally extending slots 23 formed in the side walls of the casing or body 15, as illustrated in Figures 2 and 3. The outer ends of this bar 22 are apertured, as at 24, for receiving the forwardly extending chains 25 hereinafter described. The bar 22 carries a depending substantially U-shaped bracket 26 which is secured at its lower end to the upper face of the longitudinally extending tripping plate 27. This longitudinally extending tripping plate 27 is provided with upturned hanger flanges 28 which flanges provide hanger means for the plate 27. A substantially U-shaped supporting bar or rod 29 passes through the hanger flanges 28, as is shown in Figures 1, 2 and 3, and the substantially U-shaped hanger bar 29 comprising a pair of parallel strands the inner ends of which are supported by the brackets 30 secured to the inner walls of the casing 15 near the forward end of the body 15 of the trap. The opposite ends of these parallel strands pass through the rear wall 31 of the casing 15. This plate 27 may, therefore, freely slide longitudinally.

A shield plate 32 is carried within the trap casing 15, and may be supported in any suitable or desired manner, for instance, as through the medium of supports 33 within the casing and below the plate 27. Any suitable or desired means may be employed for pulling the tripping plate 27 toward the inner end of the trap after the trap is sprung, but I preferably employ a coil spring 34 which may be anchored, as at 35, to the inner end wall 31 and secured at its opposite end, as at 36, to the plate 27.

A treadle 37 is pivotally supported upon a transverse bar 38 which may be carried by the supports 33 or secured to the sides of the casing in any desired manner, and this treadle is connected to an inverted substantially U-shaped yoke 39 having vertically extending substantially parallel legs 40, the ends of which are inturned, as at 41, for engaging the sides of the treadle 37, as shown in Figures 2, 3 and 7. The yoke 39 is provided with a transversely extending portion 42 which is adapted to be engaged by an upstanding plate 43 carried by the plate 27, and when the parts are in the position, as shown in Figure 2, this plate 43 will engage the transverse portion 42 of the yoke 39, and hold the parts in a set position. As the animal steps upon the inner end of the treadle 37 the yoke 39 will be raised out of engagement with the plate 43 and the spring 34 will cause the plate 27 to be suddenly pulled forwardly releasing the bar 22 from engagement with the flange 21 and allowing the door 19 to drop to a closed position such as is shown in Figure 3.

A bait box 45 is supported within the casing 15 preferably near the lower face of the shield plate 32 and a door 46 is hingedly secured to the front end of the bait box 45. This door or gate 46 when the parts are in a set position, as is shown in Figure 2, will normally extend in a horizontal position, this door or gate 46 constituting a closure for one end of the bait box 45 when the gate or door 46 is in a vertical position. When the parts are in the position shown in Figure 2, the animal entering the trap may see and smell the bait through the open end 47 of the bait box. The gate or door 46 is journaled, as at 48, and an operating arm 49 is suitably connected to the gate or door 46, which arm 49 is connected by means of a cable or other link connection 50 to the arm 51 secured to the lower face of the longitudinal tripping plate 27. The shield plate 32 is longitudinally slotted, as at 52, to allow sliding movement of the arm 51 as the plate 27 is moved. This shield plate will prevent the animal from crawling out through the top of the trap after once entering the same. When the trap is sprung and the parts moved from the position shown in Figure 2 to the position shown in Figure 3, the door 46 will swing to a lowered or vertical position closing the forward open end of the bait box.

If it is desired, the spring 34 may be replaced by a weight 34a attached to the door 46a, shown in the modified form illustrated in Figure 11, the weight 34a tending to pull the tripping plate after the tripping plate has been released.

In order that the door 19 may be held in a closed position, I provide a locking means in the nature of a latch 53 which is carried by a bracket 54 supported near the entrance opening 16 of the casing 15, this latch being adapted to engage the flange 55 carried by the outer face of the door 19 and normally hold the door against opening. To further prevent the opening of the door or raising of the door by the animal, and more particularly a larger animal, I provide a longitudinally movable locking member in the nature of a transverse bar 56 having its ends slidably mounted through the slots 57 of the casing 15, this bar 56 carrying a forwardly extending substantially vertical U-shaped overhanging member 58 which is adapted to overhang the top of the door 19 when the door is in a closed position. The bar 56 is slidably mounted upon the track rods 59 supported in any suitable or desired manner upon the casing 15. The ends of the bar 56 are connected to the chains 25 previously described, thereby causing the bar 56 to move forwardly in unison with the bar 22 when the trap is sprung.

The execution box previously referred to and indicated by the numeral 18 may be either permanently secured within the casing 15, or as shown preferably slidably mounted upon the tracks 60 carried by the floor of the casing 15. The execution box 18 may, in this manner, be removable if desired, and normally held against accidental removal by a suitable latch 61, if desired. The execution box 18 preferably comprises a rectangular hollow body having hinged doors 62 at its forward end which swing inwardly against the tension of the springs 63 secured to the outer sides of the doors 62, as shown in Figure 10. A stop plate 64 is provided to overhang the upper outer corners of the doors 62 to resist outward swinging movement of the doors 62. As the animal attempts to enter the box 18, the doors 62 will swing inwardly to the position shown in dotted lines, against the tension of the spring 63, and as the animal feels the presence of the door upon its neck and attempts to back out of the box, the edges of the doors will clamp tightly into its neck and choke the animal.

The operation of the trap is as follows: The animal will enter the opening 16 and pass under the door 19, the parts being in a set position, as shown in Figure 2, and when the animal steps upon the treadle 37, as shown in Figure 3, the parts will be sprung, the plate 27 sliding toward the closed end of the trap releasing the door 19 which will be engaged by the locking mechanism, as shown in Figure 3. The door 46 of the bait box 45 will also close and the animal will be imprisoned within the casing 15. When the animal attempts to enter the execution box 18 it will be choked, as illustrated and described in connection with Figure 10.

It should be understood that certain detail changes may be employed so long as such changes fall within the scope of the appended claims.

Having described the invention, what I claim as new is:

1. A trap of the class described comprising a body having an entrance opening, a door slidably mounted within the body, means for supporting the door in an open position, said last mentioned means comprising a sliding member movable to and away from the door, means for automatically pulling the sliding member away from the door, tripping means engaging the sliding member for holding the sliding member in engagement with the door, and an animal actuated treadle for actuating the tripping means for releasing the sliding member, whereby the sliding member will be automatically pulled away from the door to cause the door to move from an open to a closed position.

2. A trap of the class described comprising a casing, a vertically movable and gravity door slidably mounted within the casing, a longitudinally slidable door supporting member carried by the door and engageable with said slidable member whereby the door may be held in an elevated open position, an upstanding stop carried by the sliding member, a tripping element slidably mounted vertically within the casing and engaging the stop to hold the sliding member in a door engaging position, a treadle engaging said tripping element for moving the tripping element out of engagement with the stop for releasing said sliding member, and means for automatically moving the sliding member to a door disengaging position whereby the door may automatically drop through gravity to a closed position.

3. A trap of the class described comprising a casing, a vertically movable and gravity door slidably mounted within the casing, a longitudinally slidable door supporting member carried by the door and engageable with said slidable member whereby the door may be held in an elevated open position, an upstanding stop carried by the sliding member, a tripping element slidably mounted vertically within the casing and engaging the stop to hold the sliding member in a door engaging position, a treadle engaging said tripping element for moving the tripping element out of engagement with the stop for releasing said sliding member, means for automatically moving the sliding member to a door disengaging position whereby the door may automatically drop through gravity to a closed position, said sliding member having hanger flanges, and a hanger member constituting a trackway engaging said flanges for suspending said sliding element within said casing.

4. A trap of the class described comprising a casing, a vertically movable and gravity door slidably mounted within the casing, a longitudinally slidable door supporting member carried by the door and engageable with said slidable member whereby the door may be held in an elevated open position, an upstanding stop carried by the sliding member, a tripping element slidably mounted vertically within the casing and engaging the stop to hold the sliding member in a door engaging position, a treadle engaging said tripping element for moving the tripping element out of engagement with the stop for releasing said sliding member, tension means for automatically moving the sliding member to a door disengaging position whereby the door may automatically drop through gravity to a closed position, said sliding member having hanger flanges, and a hanger member constituting a trackway engaging said flanges for suspending said sliding element within said casing.

5. A trap of the class described comprising a casing, a vertically movable and gravity door slidably mounted within the casing, a longitudinally slidable door supporting member carried by the door and engageable with said slidable member whereby the door may be held in an elevated open position, an upstanding stop carried by the sliding member, a tripping element slidably mounted vertically within the casing and engaging the stop to hold the sliding member in a door engaging position, a treadle engaging said tripping element for moving the tripping element out of engagement with the stop for releasing said sliding member, means for automatically moving the sliding member to a door disengaging position whereby the door may automatically drop through gravity to a closed position, said casing being longitudinally slotted in its side walls, said sliding member having a transversely extending bar slidably mounted through the slotted portion of said casing, a locking member slidably mounted within the casing, and supported in a position to normally overhang the door when the door is in a closed position, and flexible means connecting said bar with said locking member for automatically moving the locking member to an overhanging position with respect to the door when the door is released to move to a closed position.

6. A trap of the class described comprising a casing, a vertically movable and gravity door slidably mounted within the casing, a longitudinally slidable door supporting member carried by the door and engageable with said slidable member whereby the door may be held in an elevated open position, an upstanding stop carried by the sliding member, a tripping element slidably mounted vertically within the casing and engaging the stop to hold the sliding member in a door engaging position, a treadle engaging said tripping element for moving the tripping element out of engagement with the stop for releasing said sliding member, means for automatically moving the sliding member to a door disengaging position whereby the door may automatically drop through gravity to a closed position, a bait box supported within said casing and having a forwardly swinging door adapted to normally close one end of the bait box, and means connecting the sliding member with the door of the bait box to hold the door of the bait box open when the sliding member is in a set position and to automatically close the door of the bait box when the sliding member is in a sprung position.

7. A trap of the class described comprising a casing, a drop door adapted to close one end of the casing, means for holding the door in an open and set position, means for releasing the last mentioned means when an animal enters the trap to cause the door to move to a closed position, a bait box within said casing, a hinged door for one end of the bait box to normally close the bait box, means connecting the door to said means for holding the door in a set position, and a weight carried by the door of the bait box for automatically pulling the means for holding the entrance door in an open position to a disengaging position.

8. A trap of the class described comprising a casing, a door for normally closing one end of the casing, automatic means for releasing the door so that the door may move to a closed position, an execution box mounted within the casing, inwardly swinging tension doors carried by the execution box, and means for limiting the outward swinging of the doors with respect to the box.

9. A trap of the class described comprising a casing, a door for normally closing one end of the casing, automatic means for releasing the door so that the door may move to a closed position, an execution box mounted within the casing, inwardly swinging tension doors carried by the execution box, means for limiting the outward swinging of the doors with respect to the box, said box being slidably mounted within said casing.

10. A trap of the class described comprising a body having an entrance opening, a door mounted upon said body and movable to and from a closed position with respect to said entrance opening, means for holding said door in an open position, said last mentioned means comprising a member movable to and away from said door, means for automatically moving said movable member away from said door, tripping means engaging said movable member in engagement with said door, and an animal actuated means for actuating said tripping means for releasing the movable member, whereby the movable member will be automatically moved away from said door to cause the door to move from an open to a closed position.

ROBERT C. BURNLEY.